Figure 1:
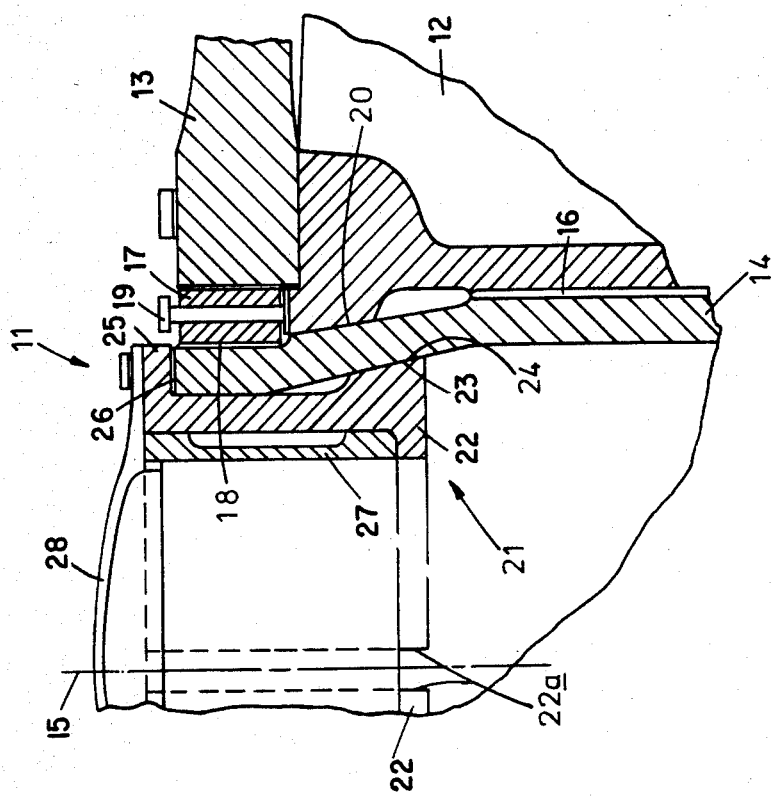

United States Patent [19]

Gormer

[11] Patent Number: 4,509,898

[45] Date of Patent: Apr. 9, 1985

[54] HELICOPTER ROTORS

[75] Inventor: Alan Gormer, Yeovil, England

[73] Assignee: Westland plc, Yeovil, England

[21] Appl. No.: 505,860

[22] Filed: Jun. 20, 1983

[30] Foreign Application Priority Data

Jul. 2, 1982 [GB] United Kingdom ............... 8219139

[51] Int. Cl.³ .............................................. B64C 11/02
[52] U.S. Cl. .................................. 416/2; 416/244 R;
403/11
[58] Field of Search ............... 416/136, 170 R, 170 A, 416/244 R, 244 A, 2; 415/9; 403/11

[56] References Cited

U.S. PATENT DOCUMENTS

| 2,464,463 | 3/1949 | Roby .............................. 416/244 R |
| 3,761,199 | 9/1973 | Ferris et al. ................. 416/244 R X |
| 3,972,491 | 8/1976 | Ferris et al. ................. 416/244 R X |
| 4,201,513 | 5/1980 | Sales .................................. 415/9 X |

FOREIGN PATENT DOCUMENTS 841942 7/1960 United Kingdom ................ 416/136

OTHER PUBLICATIONS

Navy Technical Disclosure Bulletin, vol. 6, No. 6, Jun. 1981, pp. 27-30.

Primary Examiner—Robert E. Garrett
Assistant Examiner—Joseph M. Pitko
Attorney, Agent, or Firm—Larson and Taylor

[57] ABSTRACT

A helicopter rotor includes attachment means for attaching a rotor hub to a tubular rotor drive shaft in a manner establishing a primary thrust load path and further attachment means adapted to provide a normally passive secondary thrust load path and operative automatically to retain the rotor hub in the event of a failure in the primary thrust load path. In the described embodiments the further attachment means comprise a multi-part collet consisting of a plurality of identical collet parts located internally of the drive shaft. Each collet part has an external frusto-conical surface one end for location adjacent a mating surface formed internally of the drive shaft, and a radially extending flange portion at its other end for attachment to an end surface of the drive shaft.

5 Claims, 2 Drawing Figures

HELICOPTER ROTORS

DESCRIPTION OF INVENTION

This invention relates to helicopter rotors. Conventionally, a helicopter has at least one main sustaining rotor located above a fuselage and, in the case of a single main sustaining rotor configuration, at least one anti-torque rotor located adjacent the end of a rearwardly extending tail boom. The rotors normally comprise a rotor hub supporting a plurality of generally radially extending rotor blades, the hub being attached to a rotor drive shaft in a manner such that both radial and axial thrust loads are transmitted to the shaft. The integrity of the highly loaded rotor hub attachments is therefore critical to helicopter operations since a failure in respect of either the main sustaining rotor or the anti-torque rotor would almost certainly result in the loss of the machine and its occupants.

Accordingly this invention provides a helicopter rotor comprising a rotor hub adapted to support a plurality of radially extending rotor blades and attachment means for attaching the hub to a tubular rotor drive shaft in a manner establishing a primary thrust load path, and including further attachment means adapted to provide a normally passive secondary thrust load path and operative automatically to retain the hub in the event of a failure in the primary thrust load path. The further attachment means may comprise a multi-part collet consisting of a plurality of identical collet parts located internally of the shaft. Preferably, each collet part includes an external sloping surface at one end for location adjacent a mating frustoconical surface formed internally of the drive shaft, and a radially extending flange portion at its other end for attachment to an end surface of the drive shaft.

A collet retainer ring may be located internally of the collet parts and may be retained by a cap member. In an embodiment adapted particularly for an anti-torque rotor, the cap member may be annular to accommodate a protruding axially extending pitch change actuator shaft.

The sloping surface of each collet part may be spaced-apart from the frusto-conical surface of the drive shaft in order to provide an indication of a failure of the primary thrust load path.

Figure 2:
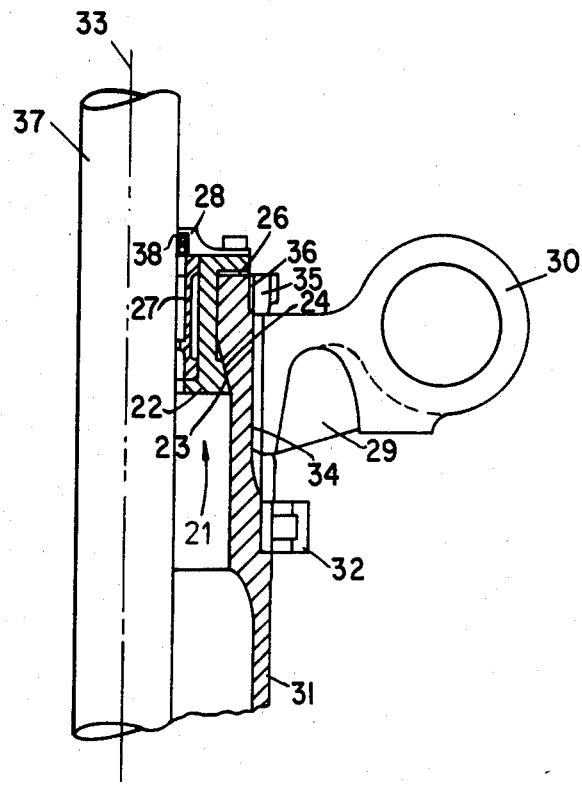

The invention will now be described by way of example only and with reference to the accompanying drawings in which, FIG. 1 is a fragmentary sectioned view of a helicopter main sustaining rotor constructed in accordance with one embodiment of the invention, and FIG. 2 is a fragmentary sectioned view of a helicopter anti-torque rotor constructed in accordance with a further embodiment of the invention.

Referring now to FIG. 1, a helicopter main sustaining rotor generally indicated at 11, includes a rotor hub 12 having a plurality of generally radially extending arms 13 each adapted to support a rotor blade (not shown). The rotor hub is attached to an upper end of a tubular rotor drive shaft 14 mounted for rotation about a generally vertical axis 15.

The rotor hub 12 and the drive shaft 14 have mating splines 16 through which rotation is transmitted from the shaft 14, and the hub is attached by a nut 17 engaged in threads 18 formed externally at the upper end of the drive shaft 14. A plurality of bolts 19 are threaded through the nut 17 for engagement with a surface of the rotor hub 12, and provide for pre-loading of mating conical surfaces 20 between the rotor hub 12 and the shaft 14 to provide a primary thrust load path.

A multi-part collet generally indicated at 21 and consisting of a plurality of identical collet parts 22 is located internally of the end of the drive shaft 14. When fitted, the collet parts 22 are spaced-apart circumferentially as indicated at 22a and each collet part 22 has an external sloping surface 23 at one end for engagement with a mating frusto-conical surface 24 formed internally of the drive shaft 14.

At its other end, each collet part 22 has a generally radially extending flange portion 25 adapted to overlap the end surface of the drive shaft 14, and shims 26 are located between the flange portions 25 of the collet parts 22 and the shaft 14 to take up any slack between surfaces 23 and 24. In the illustrated embodiment the thickness of shims 26 is selected so that no pre-load is established in the collet parts 22.

A collet retainer ring 27 is located internally of the assembled collet parts 22 and is retained by a cap member 28 bolted through the flange portions 25 to the end of the drive shaft 14.

FIG. 2 illustrates a further embodiment of the invention adapted particularly for retaining a helicopter anti-torque rotor. A rotor hub 29 having a plurality of attachment means 30 for attaching rotor blades (not shown), is attached adjacent an end of a tubular rotor drive shaft 31 mounted in bearings 32 for rotation concentrically of an axis of rotation 33. The hub 29 and drive shaft 31 have mating splines 34 and the hub is attached by a nut 35 engaged in threads 36 formed externally at the end of drive shaft 31 to provide a primary thrust load path.

An axially extending actuator shaft 37 protrudes from the end of the rotor hub 29 and is adapted during operation to change the pitch of the rotor blades collectively.

The remaining parts of the embodiment of FIG. 2 are similar to those previously described in relation to the provision of a normally passive secondary thrust load path in the embodiment of FIG. 1. Like reference numerals are used to indicate the parts and reference is to be made to the previous commentary for a detailed description. It will be noted that, in the embodiment of FIG. 2, the cap member 28 is annular in order to allow passage of the actuator shaft 37, and houses an oil seal 38.

The multi-part collet 21 of the described embodiments, provides a normally passive secondary thrust load path which operates automatically to retain the rotor hubs 12 and 29 respectively in the event of a failure of the primary load path.

Thus, during normal operation of a rotor constructed in accordance with the described embodiments of this invention, thrust loads are reacted through the threaded nuts 17 or 35 and threads 18 or 36 into the respective drive shafts 14 or 31. Additionally, in respect of the main rotor embodiment of FIG. 1, radial loads are reacted at the mated pre-loaded surfaces 20. The most vulnerable location in respect of thrust loads in such installations is the first, or lowermost, of the threads 18 or 36 on the shafts 14 or 31 in that it represents the most likely crack initiation point. It will be apparent that if a crack was to occur at this point and if such a crack propagated through the thickness of the wall of the shafts 14 or 31 to a critical extent, the hubs 12 or 29 could become detached.

The present invention overcomes this problem by providing a normally passive secondary load path. Thus, in the event of a failure of the shafts 14 or 31 as described above, thrust loads are automatically transferred through the flange portions 25 of the collet parts 22, the collet parts 22 and the mated surfaces 23 and 24 into the drive shafts 14 or 31 below the area of failure. Radial loads resulting from the wedging action of the mated surfaces 23 and 24 are reacted through the collet retainer ring 27.

Whilst two embodiments have been described and illustrated it will be understood that many modifications may be made without departing from the scope of the invention as defined in the appended claims. For example, it may be considered desirable to incorporate some means of indicating a failure in the primary thrust load path and this could be achieved by adjusting the thickness of the shim 26 so that a small gap exists between the sloping surface 23 on the collet parts 22 and the mating frusto-conical surface 24 on the shaft with the result that a failure of the primary load path and consequent operation of the secondary thrust load path will be accompanied by a small axial movement of the rotor hub which will cause vibration that will be immediately apparent to the pilot. The axial distance of the collet parts 22 between the surface 23 and the flange 25 can be extended to encompass a greater portion of the length of the respective drive shafts 14 or 31 thereby providing a secondary thrust load path that protects against a failure of the shafts 14 or 31 at any position encompassed by the collet parts 22.

What is claimed is:

1. A helicopter rotor comprising a rotor hub, a plurality of rotor blades supported by said rotor hub and extending radially therefrom, a tubular rotor drive shaft disposed within said rotor hub, primary attachment means operatively interconnecting said hub and tubular rotor drive shaft to provide a primary thrust load path, and secondary attachment means disposed internally of said drive shaft comprising a multi-part collet including a plurality of identical collet parts for retaining the rotor hub in the event of failure of the primary thrust load path.

2. A rotor as claimed in claim 1, wherein each collet part includes an external sloping surface at one end for location adjacent a mating frusto-conical surface formed internally of the drive shaft and a radially extending flange portion at its other end for attachment to an end surface of the drive shaft.

3. A rotor as claimed in claim 2, and including a collet retainer ring located internally of the collet parts and retained by a cap member.

4. A rotor as claimed in claim 3, wherein said cap member is annular to accommodate a protruding axially extending pitch change actuator shaft.

5. A rotor as claimed in claim 2, wherein the sloping surface of each collet part is spaced-apart from the mating frusto-conical surface of the drive shaft.

* * * * *